3,505,422
DEHYDROGENATION AND METHANATION
CATALYST AND PROCESS
Charles C. Brewer, Baton Rouge, La., Richard C. Fritz, Middletown, Ky., Charles R. Killian, Baton Rouge, La., and James M. Moe, Manhattan Beach, Calif.; said Killian and said Brewer assignors to Foster Grant Co., Inc., Leominster, Mass., a corporation of Delaware, and said Fritz and said Moe assignors to Chemetron Corporation, Chicago, Ill., a corporation of Delaware
No Drawing. Continuation-in-part of application Ser. No. 672,454, Oct. 3, 1967. This application Jan. 23, 1969, Ser. No. 793,548
Int. Cl. C07b 3/00, 15/02, 15/10
U.S. Cl. 260—669                                 10 Claims

ABSTRACT OF THE DISCLOSURE

The disclosure relates to a process for the production of olefinic compounds by the dehydrogenation of corresponding more saturated substances by a catalytic process in which carbon dioxide is added to a feed stream of steam and a more saturated substance which is to be dehydrogenated.

---

This application is a continuation-in-part of U.S. application Ser. No. 672,454, filed Oct. 3, 1967, now U.S. Patent No. 3,424,808.

This invention relates to an improved catalytic dehydrogenation process for the production of olefins. More particularly, this invention relates to a catalytic dehydrogenation process in which a more saturated substance, such as ethylbenzene, butylene, or butane, is dehydrogenated to a less saturated substance, such as styrene, butadiene, or butylene, respectively by passing a feed stream at an elevated temperature which comprises steam, a more saturated substance, and a minor amount of carbon dioxide, through a catalyst bed. Catalysts which consist essentially of iron oxide, a minor amount of an alkali compound of an alkali metal and a minor amount of chromium oxide, and which also may contain a minor amount of an oxide of another metal of Group VIII of the periodic system, preferably ruthenium, cobalt or nickel, are suitable for use in the process of this invention.

The production of olefins by catalytic dehydrogenation, such as the catalytic dehydrogenation of ethylbenzene to produce styrene and butylene to produce butadiene, is an endothermic reaction and in order to keep the temperature within a suitable range, such as from about 1000° F. to about 1200° F. for the production of styrene, and about 1100° F. for the production of butadiene, it is the customary practice to mix superheated steam with the ethylbenzene or butylene feed and to introduce this feed into the catalyst bed which is at a temperature within that range. Steam also functions to lower the partial pressure of hydrogen which results in a shift of the ethyl-benzene-styrene equilibrium to the styrene side. This requires the use of an amount of steam much larger than the amount normally required to purge the catalyst of any carbon formed by the water-gas reaction. In a catalytic dehydrogenation process, such as the catalytic dehydrogenation of ethyl-benzene to styrene, in which steam is mixed with the ethylbenzene feed to keep the catalyst bed within the desired temperature range, the top of the catalyst bed is kept at a temperature above the optimum temperature so that the rest of the bed is not cooled by the endothermic reaction to a temperature below the optimum for satisfactory dehydrogenation. This results in the production of excess amounts of by-products, such as benzene and toluene, by the cleavage of carbon-carbon linkages.

It has now been discovered that the disadvantages of the prior art may be overcome and a more efficient process provided for the production of olefins, such as styrene, butene, and butadiene, by catalytic dehydrogenation of a corresponding more saturated substance, by the addition of a minor amount of carbon dioxide to the feed stream of steam and a more saturated substance. This results in a substantial reduction in the amount of undesirable by-products, particularly benzene and toluene, in the production of styrene, which result from the cleavage of carbon-carbon linkages.

The temperature range is from about 570° F. to about 1200° F. for the dehydrogenation of ethylbenzene, butylene and butane. The amount of steam which is introduced with the feed is sufficient to remove by the water-gas reaction the carbon which is formed and deposited on the catalyst during the dehydrogenation reaction and to maintain the reaction temperature within the above range. The amount of steam is preferably not less than about two pounds of steam to one pound of hydrocarbon feed. The dehydrogenation reaction is conducted at a pressure of about one atmosphere. The water-gas reaction produces oxides of carbon which react with the hydrogen produced by the dehydrogenation reaction to produce methane. Since this reaction is exothermic, it reduces the amount of heat which must be introduced into the reactor by the use of steam. The carbon dioxide which is added to the steam and hydrocarbon feed supplements the amount of oxides of carbon produced by the water-gas reaction and increases the consumption of the hydrogen produced. This results in an increased production of methane. The amount of carbon dioxide added depends on the rate at which the hydrocarbon passes through the catalyst bed. Also, since an increase in the amount of carbon dioxide added decreases the percent conversion of hydrocarbon to dehydrogenation product, the amount of carbon dioxide added should not be so large as to reduce the percent conversion to an uneconomically low level. In the conversion of ethylbenzene to styrene, a conversion of less than about 50 percent is considered uneconomically low. In general, an amount of carbon dioxide is added to the steam and hydrocarbon feed so that from about 0.01 to about 0.125, preferably 0.015 to 0.05, pound of carbon dioxide per hour per pound catalyst passes through the catalyst bed when the amount of hydrocarbon passing through the catalyst bed is within the range of from about 0.3 to about 0.6 pound per hour per pound of catalyst. When the amount of carbon dioxide is above about 0.125 pound per hour per pound of catalyst the conversion rate of more saturated substance to olefinic compound of less saturation is too low.

Catalysts which are suitable for use in the dehydrogenation reactions of this invention are those which consist essentially of iron oxide, a minor amount of an oxide of an alkali metal, preferably potassium oxide, and a minor amount of chromium oxide. Such catalysts are hereinafter referred to as base catalysts. Particularly suitable are base catalysts which also contain a methanation promoter comprising a minor amount of an oxide of another Group VIII metal, preferably ruthenium, cobalt or nickel. The catalyst may also contain as a binding agent between about 5% and 30% by weight of a hydraulic cement, such a portland cement or portland cement clinker which contains free calcium oxide not chemically bound with aluminum or silica compounds. The amount of methanation promoter is within the range of from about 0.05 to about 10% of the combined weight of the iron oxide, alkali metal oxide, chromium oxide, and binder in the finished catalyst, depending upon the methanation promoter used and the method by which the catalyst is prepared.

The base catalyst, which contains portland cement or a portland cement clinker as a binder, is prepared by mixing iron oxide, preferably pigment grade alpha iron oxide ($Fe_2O_3$), potassium carbonate ($K_2CO_3$), chromic oxide ($Cr_2O_3$), and portland cement or portland cement clinker, all materials being in finely divided form, and adding sufficient water to provide an extrudable plastic mass, which is then extruded in, preferably, 1/16 to 1/4 inch diameter extrusions. The extrusions are dried for a short time, broken into short lengths, and calcined in air. Calcining may be accomplished by heating at a temperature of from about 600° C. to a temperature of about 750° C. for a period of from about three to twelve hours.

A base catalyst, in which a binder of portland cement or portland cement clinker is not present, may be prepared by a variety of methods which include mixing or co-grinding powdered iron oxide and chromium oxide, thermally decomposing a mixture of iron and chromium nitrates, coprecipitating hydrous oxides of iron and chromium, by mixing the hydrous gels or sols of iron and chromium, or by calcining a mixture of iron oxide powder and a decomposable chromium compound. A particularly suitable method is to cogrind or ball mill a mixture of powdered iron oxide and powdered chromium oxide and form a paste of this mixture with a solution containing the desired amount of alkali metal salt, preferably a potassium salt. The paste is extruded and the extrudate is dried and calcined at a temperature of from between about 700° C. and about 1000° C. and preferably between about 800° C. and about 900° C. for a period of from about five to about ten hours.

A methanation promotor may be added to the base catalyst by one of two methods. In the first method, the calcined base catalyst particles are impregnated on the surface by the use of a solution of a suitable water-soluble salt of the promotor. Impregnation in this manner may be accomplished by spraying the base catalyst particles with an aqueous solution of the water-soluble salt of the promotor, or by immersion of the base catalyst particles in an aqueous solution of the water-soluble salt of the promoter and then air drying and calcining. Calcining is accomplished by heating to a temperature within the range of from about 700 C. and about 1000° C. for a period of from about five to about ten hours. It is preferred that the finished catalyst prepared by this method contain an amount of promoter metal oxide within the range of from about 0.05% to about 1.0% by weight of the catalyst.

In the second method of adding the methanation promoter to the base catalyst, which is used when the promoter metal is nickel or cobalt, the shaped pellets or particles of the base catalyst are mulled with a suitable salt of the promoter metal, such as a nitrate or an organic salt, such as an acetate or a citrate. The cobalt or nickel salt is incorporated in the base catalyst by mulling in an amount such that after the mulled catalyst pellets are calcined, the amount of promoter metal oxide present in the finished catalyst is within the range of from about 0.4 to about 10% by weight of the catalyst. Calcining of the mulled catalyst is accomplished by heating to a temperature within the range of from about 700° C. to about 1000° C. for a period of from about five to about ten hours. It is preferred that the finished catalyst prepared by this method contain an amount of promoter metal oxide within the range of from about 0.4% to about 10% by weight of the catalyst.

The base catalyst contains about 30% to about 80% of iron oxide, about 0.5% to about 10% of chromic oxide, and about 5% to about 40% of an alkali compound of an alkali metal. The base catalyst which contains a binder of portland cement or portland cement clinker, contains from about 5% to about 30% by weight of binder in addition to the other ingredients which are present. The amount of alkali metal, preferably potassium oxide, is not particularly critical and is preferably the amount provided by using between about 5% and 40% of alkali metal carbonate in the dry ingredient mixture before calcining. Naturally occurring iron oxide may be used but it is preferred to use pigment grade iron oxide, since such grades tend to be purer and are obtained in finely ground form suitable for mixing with the other ingredients of the base catalyst. A particularly preferred base catalyst contains about 58 parts of iron oxide, about 2.5 parts of chromic oxide, about 20.5 parts of potassium oxide, and about 19.0 parts of portland cement.

The following examples illustrate more fully the preparation of the catalyst of this invention. In these examples, all parts and percentages are by weight.

EXAMPLE 1

A dehydrogenation catalyst is prepared by mixing 58.0 parts of pigment grade alpha iron oxide ($Fe_2O_3$), 30 parts of potassium carbonate ($K_2CO_3$), 2.5 parts of chromic oxide ($Cr_2O_3$), and 19.0 parts of portland cement. All of the solids are finely divided prior to mixing and sufficient water is added so that the resulting plastic mass is in extrudable form. The plastic mass is extruded into 1/8 inch diameter extrusions. The extrusions are air dried for a short time, broken into 3/16 inch pellets, and calcined in air at 750° C. for twelve hours.

In a first dehydrogenation run, the catalyst is charged into a reaction chamber. A stream of steam and ethylbenzene feed, in which the ratio of steam to ethylbenzene feed is three to one, is passed through the catalyst bed at the rate of 0.41 pound of ethylbenzene feed per hour per pound of catalyst. The composition of the ethylbenzene feed is 0.5% benzene, 0.2% toluene, and 99.4% ethylbenzene. The temperature of the stream is 1150° F. at the inlet and 1105° F. at the outlet of the reaction chamber. The temperature of the catalyst bed at the top, middle, and bottom thereof, is 1090° F., 1110° F., and 1105° F., respectively.

In a second dehydrogenation run, the procedure of the first dehydrogenation run is repeated except that an amount of carbon dioxide is added to the stream of steam and ethylbenzene feed so that 0.0144 pound of carbon dioxide per hour per pound of catalyst passes through the catalyst bed. The temperature of the stream is 1150° F. at the inlet and 1110° F. at the outlet of the reaction chamber. The temperature of the catalyst bed at the top, middle, and bottom thereof, is 1100° F., 1130° F., and 1115° F., respectively.

In a third dehydrogenation run, the procedure of the first dehydrogenation run is repeated except that an amount of carbon dioxide is added to the stream of steam and ethylbenzene feed so that 0.0294 pound of carbon dioxide per hour per pound of catalyst passes through the catalyst bed. The temperature of the stream is 1150° F. at the inlet and 1120° F. at the outlet of the reaction chamber. The temperature of the catalyst bed at the top, middle, and bottom thereof, is 1105° F., 1135° F., and 1120° F., respectively.

In a fourth dehydrogenation run, the procedure of the first dehydrogenation run is repeated except that an amount of carbon dioxide is added to the stream of steam and ethylbenzene feed so that 0.0438 pound of carbon dioxide per hour per pound of catalyst passes through the catalyst bed. The temperature of the stream is 1150° F. at the inlet and 1120° F. at the outlet of the reaction chamber. The temperature of the catalyst bed at the top, middle, and bottom thereof, is 1100° F., 1135° F., and 1120° F., respectively.

In a fifth dehydrogenation run, the procedure of the first dehydrogenation run is repeated except that an amount of carbon dioxide is added to the stream of steam and ethylbenzene feed so that 0.0514 pound of carbon dioxide per hour per pound of catalyst passes through the catalyst bed. The temperature of the stream is 1150° F. at the inlet and 1120° F. at the outlet of the reaction chamber. The temperature of the catalyst bed at the top, middle, and bottom thereof, is 1105° F., 1145° F., and 1125° F., respectively.

In a sixth dehydrogenation run, the procedure of the first dehydrogenation run is repeated except that an amount of carbon dioxide is added to the stream of steam and ethylbenzene feed so that 0.0898 pound of carbon dioxide per hour per pound of catalyst passes through the catalyst bed. The temperature of the stream is 1150° F. at the inlet and 1120° F. at the outlet of the reaction chamber. The temperature of the catalyst bed at the top, middle, and bottom thereof, is 1105° F., 1145° F., and 1120° F., respectively.

EXAMPLE 2

A dehydrogenation catalyst is prepared by spraying an aqueous solution containing 6.50 parts of cobalt acetate, $Co(CH_3CO_2)_2 \cdot 4H_2O$, on 998 parts of the catalyst of Example 1. The sprayed pellets are dried for eight hours at 110° C. and then calcined at 1200° C. for a period of twelve hours. The calcined catalyst contains 1.96 parts of cobalt oxide, calculated as CoO.

In a first dehydrogenation run, the catalyst is charged into a reaction chamber. A stream of steam and ethylbenzene feed, in which the ratio of steam to ethylbenzene feed is three to one, is passed through the catalyst bed at the rate of 0.597 pound of ethylbenzene feed per hour per pound of catalyst. The composition of the ethylbenzene feed is 0.28% benzene, 0.12% toluene, and 99.50% ethylbenzene. The temperature of the stream is 1140° F. at the inlet and 1100° F. at the outlet of the reaction chamber. The temperature of the catalyst bed at the top, middle, and bottom thereof, is 1060° F., 1095° F., and 1100° F., respectively.

In a second dehydrogenation run, the procedure of the first dehydrogenation run is repeated except that an amount of carbon dioxide is added to the stream of steam and ethylbenzene feed so that 0.125 pound of carbon dioxide per hour per pound of catalyst passes through the catalyst bed. The temperature of the stream is 1140° F. at the inlet and 1105° F. at the outlet of the reaction chamber. The temperature of the catalyst bed at the top, middle, and bottom thereof, is 1075° F., 1125° F., and 1110° F., respectively.

EXAMPLE 3

A dehydrogenation catalyst is prepared by thoroughly mixing pigment grade iron oxide with 5% of technical powdered chromium oxide. An aqueous solution of potassium carbonate and tannic acid equivalent to 4% potassium and 0.3% of tannic acid is added to form a paste containing about 27 to 35% water. The paste is mixed for an additional 20 minutes, extruded, and cut into 3/16 inch pellets. The pellets are dried at 150° to 175° C. for eight hours and then calcined at 900° C. for twelve hours.

In a first dehydrogenation run, the catalyst is charged into a reaction chamber. A stream of steam and ethylbenzene feed, in which the ratio of steam to ethylbenzene feed is three to one, is passed through the catalyst bed at the rate of 0.597 pound of ethylbenzene feed per hour per pound of catalyst. The composition of the ethylbenzene feed is 0.44% benzene, 0.17% toleune, and 99.39% ethylbenzene. The temperature of the stream is 1120° F. at the inlet and 1130° F. at the outlet of the reaction chamber. The temperature of the catalyst bed at the top, middle, and bottom thereof, is 1065° F., 1135° F., and 1135° F., respectively.

In a second dehydrogenation run, the procedure of the first dehydrogenation run is repeated except that an amount of carbon dioxide is added to the stream of steam and ethylbenzene feed so that 0.0375 pound of carbon dioxide per hour per pound of catalyst passes through the catalyst bed. The temperature of the stream is 1130° F. at the inlet and 1130° F. at the outlet of the reaction chamber. The temperature of the catalyst bed at the top, middle, and bottom thereof, is 1090° F., 1145° F., and 1130° F., respectively.

The results of the dehydrogenation runs of the three examples are presented below in tabular form in which the amount of carbon dioxide passed through the catalyst bed is given in pound per hour per pound of catalyst, the amount of benzene, toluene, ethylbenzene, and styrene in the dehydrogenation product is given in percent by weight, and material recovery is the percent by weight of dehydrogenation product based on the ethylbenzene feed.

EXAMPLE I

| Run No. | Carbon Dioxide | Benzene | Toluene | Ethyl-Benzene | Styrene | Material Recovery |
|---|---|---|---|---|---|---|
| 1 | 0 | 1.7 | 3.9 | 30.2 | 64.2 | 95.39 |
| 2 | 0.0144 | 1.5 | 2.5 | 35.6 | 60.4 | 96.05 |
| 3 | 0.0294 | 1.5 | 2.2 | 36.1 | 60.2 | 96.36 |
| 4 | 0.0438 | 1.3 | 1.6 | 42.7 | 54.4 | 95.99 |
| 5 | 0.0514 | 1.3 | 1.5 | 43.8 | 53.4 | 95.37 |
| 6 | 0.0989 | 1.3 | 1.2 | 47.0 | 40.5 | 96.27 |

EXAMPLE 2

| | | | | | | |
|---|---|---|---|---|---|---|
| 1 | 0 | 1.2 | 3.1 | 32.3 | 63.4 | 98.0 |
| 2 | 0.125 | 1.1 | 1.1 | 51.5 | 46.3 | 98.7 |

EXAMPLE 3

| | | | | | | |
|---|---|---|---|---|---|---|
| 1 | 0 | 2.21 | 4.09 | 34.59 | 59.11 | 96.6 |
| 2 | 0.0375 | 1.73 | 2.33 | 45.15 | 50.79 | 96.9 |

The results of the dehydrogenation runs in which carbon dioxide is added to the steam and ethylbenzene feed show that the carbon dioxide suppresses the formation of benzene and particularly the suppression of the formulation of toluene and also results in an improvement of material recovery. These results also show that as the amount of carbon dioxide is increased, the production of benzene and, particularly, the production of toluene is suppressed.

What is claimed is:
1. A process for dehydrogenating a hydrocarbon selected from the group consisting of mono- and di-olefins and alkylated aromatic hydrocarbons which comprises conducting a mixture of said hydrocarbon, steam, and an amount of carbon dioxide sufficient to susbtantially reduce the formation of undesirable products as a result of the cleavage of carbon-carbon linkages but insufficient to substantially reduce the production of dehydrogenation product, through a bed of catalyst selected from the class consisting of catalysts consisting essentially of iron oxide and minor amounts of an alkaline compound of an alkali metal and chromium oxide, and catalyst consisting essentially of iron oxide, minor amounts of an alkaline compound of an alkali metal, chromium oxide, and an oxide of a second Group VIII metal, whereby the formation of undesirable products as a result of cleavage of carbon-carbon double bonds is substantially reduced.

2. A process according to claim 1 in which the hydrocarbon is ethylbenzene, the amount of ethylbenzene feed passing through the catalyst bed is within the range of from about 0.3 to about 0.6 pound per hour per pound of catalyst, and the amount of carbon dioxide added to the steam and ethylbenzene feed is such that from about 0.01 to about 0.125 pound of carbon dioxide per hour per pound of catalyst passes through the catalyst bed.

3. A process according to claim 2 in which the catalyst consists essentially of iron oxide, and minor amounts of an alkaline compound of an alkali metal and chromium oxide.

4. A process according to claim 2 in which the catalysts consists essentially of iron oxide, minor amounts of an alkaline compound of an alkali metal, chromium oxide, and an oxide of a second Group VIII metal.

5. A process according to claim 2 in which the catalyst consists essentially of 30% to 80% by weight of iron oxide, 5% to 40% by weight of potassium oxide, and 0.5% to 10% by weight of chromium oxide.

6. A process according to claim 2 in which the catalyst consists essentially of 30% to 80% by weight of iron oxide, 5% to 40% by weight of potassium oxide, 0.5% to 10% of chromium oxide, and 0.05% to 10% by weight of cobalt oxide.

7. A process according to claim 3 in which the catalyst consists essentially of iron oxide, minor amounts of an alkaline compound of an alkali metal, chromium oxide, and an oxide of a second Group VIII metal.

8. A process according to claim 3 in which the catalyst consists essentially of 30% to 80% by weight of iron oxide, 5% to 40% by weight of potassium oxide, and 0.5% to 10% by weight of chromium oxide.

9. A process according to claim 3 in which the catalyst consists essentially of 30% to 80% by weight of iron oxide, 5% to 40% by weight of potassium oxide, 0.5% to 10% of chromium oxide, and 0.05% to 10% by weight of cobalt oxide.

10. A process according to claim 2 in which the amount of carbon dioxide added to the steam and ethylbenzene feed is such that from about 0.015 to about 0.05 pound of carbon dioxide per hour per pound of catalyst passes through the catalyst bed.

No references cited.

DELBERT E. GANTZ, Primary Examiner

U.S. Cl. X.R.

260—680, 683.3